United States Patent [19]
Matsubaguchi et al.

[11] Patent Number: 6,030,689
[45] Date of Patent: Feb. 29, 2000

[54] MAGNETIC RECORDING MEDIUM

[75] Inventors: Satoshi Matsubaguchi; Hiroo Inaba; Yuichiro Murayama, all of Kanagawa, Japan

[73] Assignee: Fuji Photo Film Co., Ltd., Japan

[21] Appl. No.: 08/916,905

[22] Filed: Aug. 21, 1997

[30] Foreign Application Priority Data

Aug. 27, 1996 [JP] Japan ..................................... 8-225336

[51] Int. Cl.$^7$ .................................................. G11B 5/702
[52] U.S. Cl. .......................... 428/141; 428/323; 428/329; 428/336; 428/425.9; 428/694 BS; 428/694 BM; 428/694 BR; 428/900
[58] Field of Search .................................... 428/141, 323, 428/329, 336, 425.9, 694 BS, 694 BM, 694 BR, 900

[56] References Cited

U.S. PATENT DOCUMENTS

| | | | |
|---|---|---|---|
| 5,496,622 | 3/1996 | Isobe et al. | 428/216 |
| 5,702,821 | 12/1997 | Murayama et al. | 428/425.9 |
| 5,876,833 | 3/1999 | Suzuki et al. | 428/141 |

*Primary Examiner*—Stevan A. Resan
*Attorney, Agent, or Firm*—Brinks Hofer Gilson & Lione

[57] ABSTRACT

A magnetic recording medium is disclosed, comprising a nonmagnetic support having thereon at least two coating layers which comprise:

a lower coating layer mainly comprising (1) at least one particles selected from nonmagnetic particles or soft magnetic particles and (2) a binder, formed on the support, and a magnetic layer comprising ferromagnetic particles dispersed in a binder, formed on the lower coating layer, wherein at least said lower coating layer contains a polyurethane resin having a cyclic structure and containing an ether group, and said nonmagnetic particles or soft magnetic particles contained in said lower coating layer have an average long axis length of from 0.04 to 0.20 μm and an acicular ratio (long axis/short axis) of from 2 to 10.

It is a high-output, low-noise magnetic recording medium having excellent magnetic-layer surface properties and satisfactory running durability.

18 Claims, No Drawings

MAGNETIC RECORDING MEDIUM

FIELD OF THE INVENTION

The present invention relates to a magnetic recording medium. More particularly, this invention relates to a magnetic recording medium for high-density recording/reproduction.

BACKGROUND OF THE INVENTION

Magnetic recording media are extensively used as sound-recording tapes, video tapes, floppy disks, etc. Such the magnetic recording media comprise a nonmagnetic support having thereon a magnetic layer comprising ferromagnetic particles dispersed in a binder.

Magnetic recording media are required to have a high level of properties such as electromagnetic characteristics, running durability, and running property. That is, audio tapes for music recording/reproduction are required to have a higher degree of the ability for reproducing original sounds. Video tapes are required to have excellent electromagnetic characteristics (e.g., excellent ability for reproducing original images).

Magnetic recording media are thus required to have satisfactory running durability as stated above, simultaneously with such the-excellent electromagnetic characteristics. In order to obtain satisfactory running durability, the magnetic layer generally contains an abrasive material and a lubricant.

However, in order to obtain excellent running durability with an abrasive material, the addition amount thereof should be increased to some degree, and this results in a reduced packing density of ferromagnetic particles in the magnetic layer. In the case of employing an abrasive material having a large particle diameter in order to obtain excellent running durability, the magnetic layer tends to have abrasive material particles excessively projected from the magnetic layer surface. There is hence a problem that an improvement of running durability due to an abrasive material frequently results in deteriorated electromagnetic characteristics.

In the case of using a lubricant for improving running property as well as running durability, the addition amount thereof should be increased. However, the magnetic layer is apt to be more plasticized by the increased lubricant amount and this tends to reduce the durability of the magnetic layer.

It is a matter of course that the binder as one of the main components of a magnetic layer also plays an important role in improving durability and electromagnetic characteristics. The conventionally employed binder resins such as vinyl chloride resins, cellulosic resins, urethane resins, and acrylic resins have a problem that the magnetic layers containing these resins have poor abrasion resistance to contaminate members for magnetic-tape running such as guide rolls or guide poles.

A technique which is employed for improving the above problem is to use a hard binder to form a magnetic layer having a heightened hardness.

For example, a magnetic recording medium employing a binder comprising a polyester polyurethane resin or a polycarbonate polyurethane resin is described in JP-A-6-96437. (The term "JP-A" as used herein means an "unexamined published Japanese patent application".) Although urethanes having a urethane group content of 2 to 4 mmol/g are used in the examples of JP-A-6-96437, the content of a long-chain diol is not described therein and the content of OH groups is also unclear. In JP-B-6-19821 is described a magnetic recording medium employing a binder containing a urethane-urea having a total content of urethane and urea of 1.8 to 3.0 mmol/g. (The term "JP-B" as used herein means an "examined Japanese patent publication".) The polyurethane resin obtained in a resin synthesis example of JP-B-6-19821 has a long-chain diol content of 61% by weight, has a high urethane bond concentration, and excellent durability. However, the polyurethane resin gives a coating solution which has an increased viscosity and thereby has a reduced dispersibility, resulting in reduced electromagnetic characteristics.

Magnetic recording media employing as a binder a polyurethane resin formed by using a short-chain diol having a cyclic structure have been proposed. In JP-A-61-148626 is disclosed use of a polyester polyol containing 20% of bisphenol A. Although the urethane shown in the example of JP-A-61-148626 has a bisphenol A content of 13% by weight and a polyol content of 69% by weight, the dispersibility is low because the cyclic structure therein reduces solubility in solvents. In JP-A-1-251416 is described a polyurethane produced by using bisphenol A, which is a short-chain diol having a cyclic structure, as a chain extender and as a starting material for a polycarbonate polyol. Although the polyurethane shown in the example of JP-A-1-251416 has a bisphenol A content of 16% by weight and a polyol content of 63% by weight, it also has a problem that the dispersibility is low because the cyclic structure reduces solubility in solvents. In JP-B-7-21851 is described the use of a lactone-modified polyol containing bisphenol S. Although the polyurethane shown in the example of JP-B-7-21851 has a polyol content of 52% by weight and a bisphenol S content of 13% by weight, it has the same problem because of the cyclic structure having therein.

In U.S. Pat. No. 5,153,071 is described use of a polyurethane resin containing a polyether polyol having a cyclic structure and comprises as a diol an ethylene oxide or propylene oxide adduct of bisphenol A or hydrogenated bisphenol A (molecular weight: 250–3,000). However, the polyurethanes shown in the examples of U.S. Pat. No. 5,153,071 each has a polyol content of 70% by weight or higher and an ether content of 8 mmol/g or higher and hence gives a coating film which is too soft and has impaired durability to cause head stain, etc.

In JP-A-61-190717 is described use of a polyurethane resin produced by using a poly(tetramethylene glycol) and a polycaprolactone polyol. However, since the polyurethanes shown in the examples of JP-A-61-190717 each has a polyol content of 70% by weight or higher, these polyurethanes also give coating films which are too soft and have impaired durability to cause head stain, etc.

In JP-B-6-64726 is described a polyurethane resin obtained by reacting an isocyanate-terminated prepolymer with a branched polyester polyol. However, the polyurethane shown in the synthesis example of JP-B-6-64726 has an OH group content of $8.2 \times 10^{-5}$ eq/g and gives a solution which has an increased viscosity and is thereby reduced in the dispersibility. Furthermore, due to use of a branched polyol, the resin has a reduced strength, resulting, for example, in impaired suitability for repetitions of running.

In U.S. Pat. No. 5,254,404 is described a magnetic recording medium employing a binder produced from a compound having at least one OH group at both terminals and a polyisocyanate. However, there is in U.S. Pat. No. 5,254,404 only a description that a polyester polyol is used. The resin described in U.S. Pat. No. 5,254,404 has a reduced strength due to the branched polyester polyol, resulting, for example, in impaired suitability for repetitions of running.

In JP-A-62-82510 is described a binder comprising a polyurethane resin in which the number of molecular terminals in a main chain and branches, is 3 or more on the average and at least two terminals have a primary hydroxyl group. Although the polyurethane resins shown in the examples of JP-A-62-82510 are produced by using a polyester polyol, the resins are insufficient in strength, suitability for repetitions of running, etc.

As described above, according to the prior art references described above, the polyurethane resins and polyurethane-urea resins used as binders for magnetic recording media are generally produced by using a long-chain diol having a hydrophilic segment, such as a polyester, polyether, or polycarbonate. The polyurethane resins shown in the examples given in those references each has a long-chain diol content of 25% by mole or higher.

However, since the polyurethane resins and polyurethane-urea resins described above each has a hydrophilic segment, the affinity thereof for organic solvents is reduced and the hydrophilic polar groups are apt to cause aggregation. As a result, the extension of molecular chains in organic solvents tends to be reduced. Thus, the hydrophilic segments function to reduce the dispersibility of fine ferromagnetic particles.

When used for producing polyesters, the long-chain diols having a hydrophilic segment have a problem that the ester groups are susceptible to hydrolysis to impair storage stability. When used for producing polyethers, those long-chain diols give polyethers which have a low $T_g$, are too soft, and have low strength, such as those produced from poly (tetramethylene ether glycol), poly(propylene glycol), or poly(ethylene glycol).

A magnetic recording medium is well-known which has a magnetic layer formed on a nonmagnetic layer to thereby have a reduced magnetic-layer thickness. For attaining higher-density recording, it has become necessary to form a magnetic layer having a smaller thickness and containing even finer ferromagnetic metal particles. In addition, the surface properties of the nonmagnetic layer itself on which a thin magnetic layer is formed are coming to exert greater influences on the surface properties of the magnetic layer. Although an attempt was made to improve the surface properties of a nonmagnetic layer by using nonmagnetic particles having a reduced particle size, this technique has a problem that such fine nonmagnetic particles have reduced dispersibility like ferromagnetic metal particles and this leads to impaired surface properties. In the case where a suitable kind of binder is selected for ensuring the dispersibility of nonmagnetic particles, there is a problem that the binder is insufficient in the strength necessary for holding the nonmagnetic particles and, as a result, the nonmagnetic layer peels off at the tape edges. In the case where soft magnetic particles are used with any of the conventional binders to form a lower layer for improving the electromagnetic characteristics of the magnetic layer to be formed thereon, the soft magnetic particles show insufficient dispersibility due to the magnetically attractive force among the particles to pose the same problem as the above.

As described above, a binder in which nonmagnetic particles and soft magnetic particles have excellent dispersibility and which has both of excellent hardness (i.e., a high $T_g$ and a high Young's modulus) and toughness (elongation) and has excellent durability is desired. However, any of the polyurethane resins described above is unable to sufficiently meet these requirements. Any person skilled in the art has failed to find out a binder capable of satisfying those requirements and optimum nonmagnetic-particle conditions suitable for the binder.

SUMMARY OF THE INVENTION

An object of the present invention is to provide a high-output, low-noise magnetic recording medium having excellent surface properties of the magnetic layer and satisfactory running durability.

The present invention has the following constitutions.

(1) A magnetic recording medium comprising a nonmagnetic support having thereon at least two coating layers which comprises:

a lower coating layer mainly comprising nonmagnetic particles or soft magnetic particles and a binder, formed on the support, and a magnetic layer comprising ferromagnetic particles dispersed in a binder, formed on the lower coating layer, wherein at least said lower coating layer contains a polyurethane resin having a cyclic structure and containing an ether group, and the nonmagnetic particles or soft magnetic particles contained in the lower coating layer have an average long axis length of from 0.04 to 0.20 μm and an acicular ratio (long axis/short axis) of from 2 to 10.

Further, the preferable embodiments of the present invention are shown below.

(2) The magnetic recording medium as described in the above item (1), wherein the polyurethane resin contained as a binder is a polyurethane resin which is a reaction product obtained mainly from a diol and an organic diisocyanate, and the diol contains short-chain diol units each having a cyclic structure in an amount of from 17 to 40% by weight based on the polyurethane resin as well as long-chain diol units containing an ether group in an amount of from 1.0 to 5.0 mmol per g of the whole polyurethane resin, in an amount of from 10 to 50% by weight based on the polyurethane resin.

Here, the term "short-chain diol" means one having a molecular weight of from 50 to less than 500, and the term "long-chain diol" means one having a molecular weight of from 500 or more, and an upper limit of weight average molecular weight of 5,000.

(3) The magnetic recording medium as described in the above item (1), wherein the nonmagnetic particles or soft magnetic particles have a coercive force ($H_c$) of from 0 to 300 (Oe) and a saturation magnetization ($\sigma_s$) of from 0 to 80 emu/g.

(4) The magnetic recording medium as described in the above item (1), wherein the nonmagnetic particles or soft magnetic particles contain aluminum in an amount of from 0.5 to 10 atomic % based on the iron and silicon in an amount of from 0.5 to 5 of atomic % based on the iron.

(5) The magnetic recording medium as described in the above item (1), wherein the magnetic layer has a thickness of from 0.05 to 1.0 μm.

The present inventor directed attention to polyurethane resins among binders for lower coating layers (hereinafter referred to also as "lower layers"), and investigated the influences of the shape and size of nonmagnetic particles or soft magnetic particles (the two kinds of particles are called also "lower-layer main particles") on the dispersibility thereof. As a result, it was found that the surface properties of a magnetic layer are improved and both electromagnetic characteristics and durability are improved, when a polyurethane resin having a cyclic structure and containing an ether group is used and when lower-layer main particles having an average long axis length of from 0.04 to 0.20 μm and an acicular ratio (long axis/short axis) of from 2 to 10 are used. These improvements are attributable to the presence of the cyclic structure which makes the polyurethane resin have a heightened glass transition point ($T_g$), and also to the presence of the ether group which brings about an enlarged radius of gyration and thereby greatly improves the dispersibility of lower-layer main particles. In the case where such the polyurethane resin is used in a magnetic layer, an effect that the surface properties and running durability of the magnetic layer are improved further because the dispersibility of ferromagnetic particles also is improved like that of the lower-layer main particles.

These effects are produced as follows. When a magnetic layer having a reduced thickness is formed on a lower layer, the surface properties of the lower layer influence the surface roughness of the magnetic layer. Since lower-layer main particles consisting of fine particles are apt to aggregate, it is difficult to obtain a lower layer having a smooth surface. This tendency is pronounced especially when the lower-layer main particles have an average long axis length of from 0.04 to 0.20 μm and an acicular ratio (long axis/short axis) of from 2 to 10. In the case where the specific polyurethane resin described above is used in combination with such the fine particles, it has become possible to obtain satisfactory dispersibility and to form a coating layer having a smooth surface and a high $T_g$. The specific polyurethane resin has been ascertained to have a larger radius of gyration than that of conventional polyurethanes due to presence of the ether group. It is presumed that in the stage of a coating solution, widely extended molecules of the binder function to inhibit aggregation of lower-layer main particles. Furthermore, in the case of soft magnetic particles having considerably reduced magnetic properties (e.g., a coercive force of 300 (Oe) or lower and a $\sigma_s$ of 80 emu/g or lower), the dispersibility thereof in conventional polyurethanes is more insufficient because these particles are fine and because of the magnetic attractive force among the particles. However, since the specific polyurethane resin of the present invention is a binder whose molecule extends widely, it functions to inhibit such the soft magnetic particles from aggregating. As a result, a lower layer having satisfactory surface properties can be obtained.

DETAILED DESCRIPTION OF THE INVENTION

The polyurethane resin for use in the present invention is not particularly limited as long as it has a cyclic structure and contains an ether group.

A preferred example of the polyurethane resin for use in the present invention is a reaction product obtained mainly from a diol and an organic diisocyanate, and contains short-chain diol units having at least one cyclic structure and long-chain diol units containing an ether group in an amount of from 1.0 to 5.0 mmol per g of the whole polyurethane resin. The amounts of the short-chain diol units and the long-chain diol units are from 17 to 40% by weight and from 10 to 50% by weight, respectively, based on the amount of the polyurethane resin.

Preferred examples of the short-chain diol having at least one cyclic structure include diols having at least one aromatic or alicyclic structure, such as bisphenol A, the hydrogenated bisphenol A represented by the following formula (I), bisphenol S, bisphenol P, ethylene oxide adducts thereof, propylene oxide adducts thereof, or ethylene oxide and propylene oxide adducts of these diols, cyclohexanedimethanol, and cyclohexanediol.

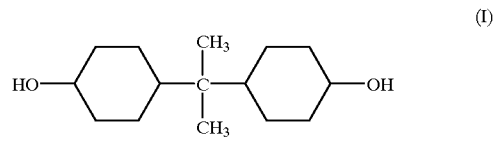

More preferred among those diols are the hydrogenated bisphenol A represented by formula (I) and ethylene oxide or propylene oxide adducts thereof.

The content of the short-chain diol units in the polyurethane resin is preferably from 17 to 40% by weight, more preferably from 20 to 30% by weight, based on the polyurethane rein. If the content thereof is lower than 17% by weight, the polyurethane resin gives a coating film which is too soft to have a sufficient strength, resulting in a reduced still durability. If the content thereof exceeds 40% by weight, the polyurethane resin has a reduced solubility in solvents and the dispersibility of lower-layer main particles therein tends to be reduced. Hence, the resulting lower coating layer not only tends to have reduced electromagnetic characteristics but has a reduced strength.

The short-chain diol having at least one cyclic structure is selected from those having a molecular weight, equal to or more than 50 but less than 500, more preferably from 100 to 400, and most preferably from 100 to 300. If the molecular weight thereof is lower than 50, at least the lower layer is brittle, resulting in a reduced durability. If the molecular weight thereof is equal to or more than 500 (in the case of containing no short-chain diol having a cyclic structure), at least the lower layer has a lowered glass transition temperature ($T_g$) and is hence too soft, resulting in a reduced durability.

The short-chain diol having at least one cyclic structure may be used in combination with other diols. Examples of the optionally used diols include aliphatic diols such as ethylene glycol, 1,3-propylenediol, 1,2-propylene glycol, 1,4-butanediol, 1,5-pentanediol, 1,6-hexanediol, 2,2-dimethylpropanediol, 1,8-octanediol, 1,9-nonanediol, diethylene glycol, cyclohexane-1,4-diol, and diols such as ethylene oxide or propylene oxide adducts of N-diethanolamine.

The content of the long-chain diol units containing an ether group in the polyurethane resin is preferably from 10 to 50% by weight, more preferably from 30 to 40% by weight. If the content thereof is lower than 10% by weight, the polyurethane resin has a reduced solubility in solvents and the dispersibility of particles therein is hence reduced. If the content thereof exceeds 50% by weight, the polyurethane resin gives a coating film having a reduced strength and hence a reduced durability.

The amount of the ether group contained in the long-chain diol units is preferably from 1.0 to 5.0 mmol, more preferably from 2.0 to 4.0 mmol, per g of the polyurethane resin. If the amount thereof is below 1 mmol/g, the polyurethane resin has a reduced adsorption power onto magnetic particles, resulting in reduced dispersibility. If the amount thereof exceeds 5.0 mmol/g, the polyurethane resin has a reduced solubility in solvents, resulting in a reduced dispersibility.

Preferred examples of the long-chain diol include polyethylene oxide and/or propylene oxide adducts of bisphenol A, hydrogenated bisphenol A, bisphenol S or bisphenol P, poly(propylene glycol), poly(ethylene glycol), and poly(tetramethylene glycol). Especially preferred are the compounds represented by the following formula (II).

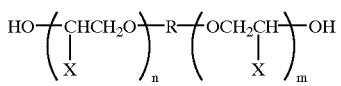

(II)

R is at least one of the following

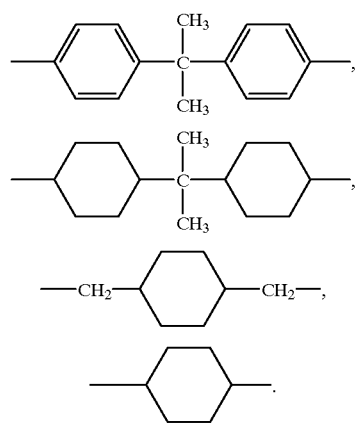

In formula (II), n and m each is a number of from 3 to 24, preferably from 3 to 20, more preferably from 4 to 15. If at least either of n and m is smaller than 3, the polyurethane resin has a heightened urethane bond concentration and hence tends to have a reduced solubility in solvents and be reduced in the ability to disperse particles therein. Such a polyurethane resin therefore tends to give a brittle coating film having a reduced durability. If at least either of n and m exceeds 24, the polyurethane resin gives too soft a coating film, resulting in a reduced still durability.

In the long-chain diols represented by formula (II), R is preferably represented by the following formula (1) or (2).

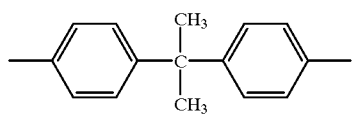

(1)

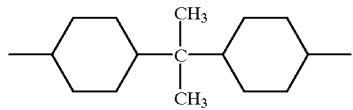

(2)

R is more preferably represented by (1).

Since the polyurethane resin used in the present invention has the cyclic structure, it gives a coating film having a high strength and excellent durability.

In the long-chain diols represented by formula (II), X is preferably a hydrogen atom or a methyl group, more preferably methyl.

Here, all of X which are parenthesized by n or m are not always the same. For example, when n is 2, two X's may be a hydrogen atom or a methyl group, or one of two X's may be a hydrogen atom and the other may be a methyl group.

The polyurethane resin having $CH_3$ branches of propylene is highly soluble in solvents and has the excellent ability to disperse particles therein.

The weight-average molecular weight ($M_w$) of the long-chain diol is preferably from 500 to 5,000, more preferably from 800 to 2,000. If the weight-average molecular weight thereof exceeds 5,000, the polyurethane resin gives a coating film which has a reduced strength and is too soft and which therefore has a reduced durability.

The polyurethane resin preferably has from 3 to 20 OH groups per one molecule, more preferably from 4 to 5 OH groups per molecule. If the number of OH groups contained in the polyurethane resin is below 3 per one molecule, reactivity with an isocyanate hardener is reduced, resulting in a coating film which tends to have a reduced strength and a reduced durability. If the number of OH groups exceeds 20 per one molecule, the polyurethane resin tends to have a reduced solubility in solvents and the dispersibility of particles therein tends to be reduced.

A compound having three or more OH groups can be used for regulating the OH group content of the polyurethane resin. Examples of the polyfunctional compound include trimethylolethane, trimethylolpropane, trimellitic anhydride, glycerol, pentaerythritol, and hexanetriol. Examples thereof further include branched polyesters and polyetheresters which each has three or more OH groups and is obtained from a dibasic acid and any of the aforementioned examples of the polyfunctional compounds as a glycol ingredient, and which are used as polyester polyol starting materials in the prior art technique described in JP-B-6-64726. Preferred are compounds each having three OH groups. If a compound having four or more OH groups is used, gelation is apt to occur during synthesis reaction.

The polyurethane resin used in the present invention preferably contains in the molecule thereof at least one kind of polar group selected from the group consisting of —$SO_3M$, —$OSO_3M$, —COOM, —$PO_3MM'$, —$OPO_3MM'$, —NRR', and —$N^+RR'R''COO^-$ (wherein M and M' each independently represents hydrogen, an alkali metal, an alkaline earth metal, or an ammonium salt, and R, R', and R" each independently represents an alkyl group having 1 to 12 carbon atoms), especially preferably from —$SO_3M$ and —$OSO_3M$. The content of these polar groups is preferably from $1 \times 10^{-5}$ to $2 \times 10^{-4}$ eq/g, more preferably from $5 \times 10^{-5}$ to $1 \times 10^{-4}$ eq/g. If the content thereof is lower than $1 \times 10^{-5}$ eq/g, the polyurethane resin has as insufficient adsorption power onto lower-layer main particles, resulting in a reduced dispersibility. If the content thereof exceeds $2 \times 10^{-4}$ eq/g, the polyurethane resin has a reduced solubility in solvents, resulting in a reduced dispersibility.

Examples of the organic diisocyanate compound (which is a component other than a starting material for synthesizing the polyurethane resin of the present invention) include aromatic diisocyanates such as 2,4-tolylene diisocyanate, 2,6-tolylene diisocyanate, xylene 1,4-diisocyanate, xylene 1,3-diisocyanate, 4,4'-diphenylmethane diisocyanate, 4,4-diphenyl ether diisocyanate, 2-nitrodiphenyl 4,4'-diisocyanate, 2,2'-diphenylpropane 4,4'-diisocyanate, 4,4'-diphenylpropane diisocyanate, m-phenylene diisocyanate, p-phenylene diisocyanate, naphthylene 1,4-diisocyanate, naphthylene 1,5-diisocyanate, and 3,3'-dimethoxydiphenyl 4,4'-diisocyanate, aliphatic diisocyanates such as lysine diisocyanate, and alicyclic diisocyanates such as isophorone diisocyanate, hydrogenated tolylene diisocyanate, and hydrogenated diphenylmethane diisocyanate.

The number-average molecular weight ($M_n$) of the polyurethane resin used in the present invention is preferably from 5,000 to 100,000, more preferably from 10,000 to 50,000, most preferably from 20,000 to 40,000. If the number-average molecular weight thereof is lower than 5,000, at least the lower layer has a reduced strength, resulting in a reduced durability. If the number-average molecular weight thereof exceeds 100,000, the polyurethane resin has a reduced solubility in solvents, resulting in a reduced dispersibility.

The polyurethane resin used in the present invention has a glass transition temperature ($T_g$) of from 0 to 200° C., preferably from 30 to 150° C., more preferably from 30 to 130° C. If the $T_g$ thereof is lower than 0° C., at least the lower layer has a reduced strength at high temperatures, resulting in a reduced durability and a reduced storage stability. If the $T_g$ thereof exceeds 200° C., the polyurethane resin gives a coating film having a reduced suitability for calendering, resulting in reduced electromagnetic characteristics.

In the case where the binder according to the present invention is used for forming at least a lower layer, the polyurethane resin of the present invention may be used in combination with a synthetic resin based on vinyl chloride. The vinyl chloride resin which can be used together with the polyurethane resin has a degree of polymerization of preferably from 200 to 600, more preferably from 250 to 450. The vinyl chloride resin may be a copolymer of vinyl chloride with another vinyl monomer such as vinyl acetate, vinyl alcohol, vinylidene chloride, or acrylonitrile. The polyurethane resin may also be used in combination with a cellulose derivative (e.g., a nitrocellulose resin), an acrylic resin, a poly(vinyl acetal) resin, a poly(vinyl butyral) resin, an epoxy resin, a phenoxy resin, etc. These optional resins may be used either alone or in combination of two or more thereof.

In the case where the polyurethane resin is used in combination with one or more other synthetic resins, the content of the polyurethane resin contained in at least the lower layer is preferably at least 10% by weight, more preferably at least 20% by weight, based on the total amount of the binder. If the content of the polyurethane resin is lower than 10% by weight, the binder has a reduced solubility in solvents, resulting in a reduced dispersibility.

The content of a vinyl chloride resin in the binder is preferably from 10 to 80% by weight, more preferably from 20 to 70% by weight, most preferably from 30 to 60% by weight, based on the total amount of the binder.

In the present invention, a polyisocyanate compound can be used as a hardener for crosslinking the polyurethane resin or other resin(s) used in combination therewith.

The isocyanate compound can be selected from polyisocyanate compounds used as a hardener component for conventional polyurethane resins and like. Specific examples of such the polyisocyanate compound include the reaction product of 3 moles of tolylenediisocyanate and 1 mole of trimethylolpropane (e.g., Desmodur L-75, made by Bayer Co., Ltd.), the reaction product of 3 moles of diisocyanate, such as xylylenediisocyanate or hexamethylenediisocyanate, and 1 mol of trimethylolpropane, the buiret adduct obtained from 3 moles of hexamethylenediisocyanate, the isocyanurate compound obtained from 5 moles of tolylenediisocyanate, the isocyanurate adduct obtained from 3 moles of tolylenediisocyanate and 2 moles of hexamethylenediisocyanate, and isophoronediisocyanate-diphenylmethanediisocyanate polymers.

The amount of a polyisocyanate compound contained in the coating layer which forms a lower, magnetic, or another layer is preferably from 5 to 50% by weight, more preferably from 10 to 40% by weight, based on the amount of the binder (total amount of all resin ingredients and the hardener).

In the case where the coating layer is cured by electron beam irradiation, a compound having a reactive double bond such as urethane acrylate can be used.

The amount of the binder in the lower layer is usually from 10 to 35 parts by weight, preferably from 20 to 30 parts by weight, per 100 parts by weight of the lower-layer main particles. The amount of the binder in the magnetic layer is usually preferably from 5 to 30 parts by weight, more preferably from 10 to 25 parts by weight, per 100 parts by weight of the ferromagnetic particles.

The magnetic recording medium of the present invention can basically have any desired shape. Examples thereof include tapes, disks, sheets, and cards.

The magnetic recording medium of the present invention can have any layer constitution, as long as it basically comprises a nonmagnetic support having thereon at least two layers comprising a lower coating layer and a magnetic layer formed thereon, and at least the lower coating layer contains a polyurethane resin and the lower-layer main particles described above. The lower coating layer is a non-recording layer which contains nonmagnetic particles or soft magnetic particles as the lower-layer main particles and contains no ferromagnetic particles. The magnetic layer means a layer which contains ferromagnetic particles and on which information can be magnetically recorded and reproduced.

For example, in a multilayered constitution, the thickness of the magnetic layer is preferably from 0.05 to 1.0 μm, more preferably from 0.1 to 0.5 μm, most preferably from 0.1 to 0.3 μm, while that of the lower layer is from 0.8 to 3 μm.

Although the polyurethane resin according to the present invention should be contained-in at least the lower layer together with the specific lower-layer main particles described above, the polyurethane resin can be preferably contained also in other layers, in particular the magnetic layer.

The lower coating layer is then explained.

The lower-layer main particles for use in the lower layer have an average long axis length of from 0.04 to 0.20 μm, preferably from 0.07 to 0.18 μm, more preferably from 0.1 to 0.16 μm, and an acicular ratio (long axis/short axis) of from 2 to 10, preferably from 3 to 9, more preferably from 5 to 9. The lower-layer main particles are preferably non-magnetic particles or soft magnetic particles having a coercive force ($H_c$) of preferably from 0 to 300 (Oe), more preferably from 0 to 100 (Oe) and a saturation magnetization ($\sigma_s$) of preferably from 0 to 80 emu/g, more preferably from 0 to 50 emu/g.

The nonmagnetic particles can be selected from inorganic compounds (e.g., metal oxides, metal carbonates, metal sulfates, metal nitrides, metal carbides and metal sulfides) and nonmagnetic metals. Specific examples of these inorganic compounds include titanium oxides ($TiO_2$, TiO), α-alumina having an alpha-conversion of 90 to 100%, β-alumina, γ-alumina, α-iron oxide, chromium oxide, zinc oxide, tin oxide, tungsten oxide, vanadium oxide, silicon carbide, cerium oxide, corundum, silicon nitride, titanium carbide, silicon dioxide, magnesium oxide, zirconium oxide, boron nitride, calcium carbonate, calcium sulfate, barium sulfate, molybdenum disulfide, goethite, and aluminum hydroxide. These inorganic compounds may be used alone or in combination of two or more thereof. Especially preferred are titanium dioxide, zinc oxide, iron oxide, and barium sulfate.

The soft magnetic particles particularly preferably have an $H_c$ of from 5 to 150 Oe and a $\sigma_s$ of from 1 to 50 emu/g.

Examples of the soft magnetic particles include particulate iron, nickel, particulate magnetite, Fe—Si, Fe—Al, Fe—Ni, Fe—Co, Fe—Co—Ni, and Fe—Al—Co (Sendust) alloys, Mn—Zn ferrite, Ni—Zn ferrite, Mg—Zn ferrite, Mg—Mn ferrite, and other soft magnetic materials described in Chikazumi Akinobu, "Kyōjiseitai No Butsuri (Ge) Jikitokusei To Ōyō (Physics of Ferromagnetics (last volume), Magnetic Properties and Applications)", Shōka-bō, 1984, pp. 368–376.

At least a part of the surface of these nonmagnetic particles or soft magnetic particles is preferably covered with $Al_2O_3$, $SiO_2$, $TiO_2$, $ZrO_2$, $SnO_2$, $Sb_2O_3$, or ZnO. From the standpoint of dispersibility, those covered with $Al_2O_3$, $SiO_2$, $TiO_2$, and $ZrO_2$ are more preferred, and those covered with $Al_2O_3$, $SiO_2$, and $ZrO_2$ are most preferred. These compounds may be used either in combination of two or more thereof or alone. A method in which the particles are treated, first to form alumina on the surface of the particles and then the resulting particles are treated to form silica on the surface of the particles, or vice versa, or a method in which the alumina and silica may be formed substantially at the same time may be used. The surface covering layer comprising the above compound may be formed according to purposes, a homogeneous and dense surface layer is generally preferred.

In the case of using nonmagnetic particles or soft magnetic particles containing iron as the main component, the particles preferably contain aluminum in an amount of from 0.5 to 10%, more preferably from 2 to 7%, and silicon in an amount of from 0.5 to 5%, more preferably from 1 to 2%, in terms of atomic percentage, based on the iron.

The lower-layer main particles have a specific surface area of usually from 1 to 100 m²/g, preferably from 40 to 70 m²/g, and a pH of preferably from 5.5 to 10. The particles have a DBP absorption of from 5 to 100 ml/100 g, preferably from 10 to 80 ml/100 g, more preferably from 20 to 60 ml/100 g, and a specific gravity of from 1 to 12, preferably from 3 to 6.

A carbon black may be incorporated into the lower layer. This incorporation is effective not only in lowering the surface electric resistance ($R_s$), which is a known effect, but also in obtaining a desired micro-Vickers hardness. For this purpose, furnace black for rubbers, thermal black for rubbers, coloring carbon black, acetylene black, or the like can be used.

The carbon black has a specific surface area of from 100 to 500 m²/g, preferably from 150 to 400 m²/g, a DBP absorption of from 20 to 400 ml/100 g, preferably from 30 to 200 ml/100 g, and an average particle diameter of from 5 to 80 nm, preferably from 10 to 50 nm, more preferably from 10 to 40 nm. Furthermore, the carbon black preferably has a pH of from 2 to 10, a water content of from 0.1 to 10%, and a tap density of from 0.1 to 1 g/ml. Specific examples of the carbon black for use in the present invention include BLACKPEARLS 2000, 1300, 1000, 900, 800, 880, 700, and VULCAN XC-72 (manufactured by Cabot Corp.); #3050B, 3150B, 3250B, #3750B, #3950B, #950, #650B, #970B, #850B, and MA-600 (manufactured by Mitsubishi Kasei Corporation), Japan; CONDUCTEX SC, RAVEN 8800, 8000, 7000, 5750, 5250, 3500, 2100, 2000, 1800, 1500, 1255, and 1250 (manufactured by Columbia Carbon Co.); and Ketjen Black EC (manufactured by Akzo Co., Ltd.).

For the lower layer, the same lubricants, dispersants, additives, solvents, and dispersing techniques as those for magnetic layers can be used. In particular, with respect to the amounts and kinds of binders and the amounts and kinds of additives and dispersants, well-known techniques usable for magnetic layers can be applied.

In the present invention, the above-described ingredients, including resin ingredients, a hardener, and lower-layer main particles, are kneaded and dispersed together with solvents ordinarily used for the preparation of coating compositions, e.g., methyl ethyl ketone, dioxane, cyclohexanone, and ethyl acetate, to thereby give a coating composition for lower-layer formation. The kneading/dispersion operation can be conducted in an ordinary way.

The ferromagnetic particles for use in the magnetic layer are particles of, e.g., a ferromagnetic iron oxide, a cobalt-containing ferromagnetic iron oxide, barium ferrite, or a ferromagnetic metal. The ferromagnetic particles have an $S_{BET}$ (BET specific surface area) of from 40 to 80 m²/g, preferably from 50 to 70 m²/g, a crystallite size of from 12 to 25 nm, preferably from 13 to 22 nm, more preferably from 14 to 20 nm, a long axis length of from 0.05 to 0.25 μm, preferably from 0.07 to 0.2 μm, more preferably from 0.08 to 0.15 μm, and a pH of preferably 7 or higher. Examples of the ferromagnetic metal particles include particles of elemental metals and metal alloys, such as iron, nickel, Fe—Co, Fe—Ni, Co—Ni, and Co—Ni—Fe. These alloys may contain, in an amount up to 20% by weight of the metal components, one or more other elements selected from the group consisting of aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, and bismuth. Ferromagnetic metal particles containing a small amount of water, a hydroxide, or an oxide may be used. Processes for producing these ferromagnetic particles are well-known, and the ferromagnetic particles to be used in the present invention can be produced by a well-known method.

Although the ferromagnetic particles are not particularly limited in shape, the particles usually have an acicular, granular, dice, ellipsoidal, or tabular shape or the like. Acicular ferromagnetic particles are especially preferably used.

In the present invention, the above-described resin ingredients, hardener, and ferromagnetic particles are kneaded and dispersed together with solvents ordinarily used for the preparation of magnetic coating compositions, e.g., methyl ethyl ketone, dioxane, cyclohexanone, and ethyl acetate, to thereby give a coating composition for magnetic-layer formation. The kneading/dispersion operation can be conducted in an ordinary way.

Besides the ingredients described above, the coating composition for magnetic-layer formation may contain ordinarily used additives and fillers. Examples of these optional ingredients include abrasive materials such as $\alpha$-$Al_2O_3$ and $Cr_2O_3$, antistatic agents such as carbon black, lubricants such as fatty acids, fatty acid esters, and silicone oils, and dispersants.

The coating composition for magnetic-layer formation and the coating composition for lower-layer formation, each prepared from the ingredients described above, are applied to a nonmagnetic support to form a lower layer and a magnetic layer.

A biaxially oriented nonmagnetic support can be used in the present invention. Examples of the material for the nonmagnetic support include well-known polymers such as poly(ethylene naphthalate), poly(ethylene terephthalate), polyamides, polyimides, polyamideimides, aromatic polyamides, and poly(benzoxazole). Preferred are poly(ethylene naphthalate) and aromatic polyamides. These nonmagnetic supports may be previously subjected to corona treatment, plasma treatment, adhesion-facilitating treatment, heat treatment, etc. These supports which can be used in the present invention preferably have such excellent surface smoothness that the center-line average surface roughness thereof is from 0.1 to 20 nm, preferably from 1 to 10 nm, as measured at a cut-off value of 0.25 mm. It is preferred that these nonmagnetic supports not only have a low center-line average surface roughness but have no large projections of 1 μm or larger.

The magnetic recording medium of the present invention is produced, for example, as follows. Each coating composition is applied to a surface of a nonmagnetic support which is kept running, in such an amount as to result in a dry coating layer having a thickness of preferably from 0.05 to 5 μm, more preferably from 0.07 to 3 μm. The coating composition for magnetic-layer formation and the coating composition for lower-layer formation may be applied by successive or simultaneous multiple layer coating method.

Coating apparatuses usable for applying the coating composition for magnetic-layer formation include an air doctor coater, blade coater, rod coater, extrusion coater, air knife coater, squeeze coater, impregnation coater, reverse-roll coater, transfer roll coater, gravure coater, kiss-roll coater, cast coater, spray coater, and spin coater.

With respect to these coating apparatuses, reference may be made, for example, to "Saishin Kōtingu Gijutsu (The Newest Coating Techniques)" published by Sogo Gijutsu Center K.K. (May 31, 1983).

In the case where the present invention is applied to a magnetic recording medium having at least two coating layers, the following coating apparatuses and methods may be proposed as examples.

(1) The coating composition (i.e., solution) for lower-layer formation is applied first with a coating apparatus commonly used for applying magnetic coating compositions, e.g., a gravure, roll, blade, or extrusion coater. The coating composition for upper-layer formation is then applied, while the lower coating layer is in an undried state, by means of a support-pressing extrusion coater such as those disclosed, e.g., in U.S. Pat. No. 4,480,583, 4,681,062 and 5,302,206.

(2) The coating compositions respectively for upper- and lower-layer formation are applied almost simultaneously using a single coating head having two slits for passing coating compositions, such as those disclosed in U.S. Pat. Nos. 4,854,262, 5,072,688 and 5,302,206.

(3) The coating compositions respectively for upper- and lower-layer formation are applied almost simultaneously with an extrusion coater equipped with a back-up roll, as disclosed in JP-A-2-174965.

The nonmagnetic support used in the present invention may have a back coat layer (backing layer) on the side opposite to the side where a magnetic coating composition has been applied. The back coat layer is formed by applying a coating composition prepared by dispersing particulate ingredients, such as an abrasive material and an antistatic agent, and a binder into an organic solvent, on the side opposite to the side where a magnetic coating composition has been applied. Examples of the particulate ingredients include various inorganic pigments and carbon black. Examples of the binder include resins such as nitrocellulose, phenoxy resins, vinyl chloride resins, and polyurethanes; these resins may be used alone or as a mixture thereof.

The nonmagnetic support may have an adhesive layer on each of its surfaces where a magnetic coating composition and a coating composition for back coat layer formation are to be applied respectively.

The applied coating layer of a magnetic coating composition is dried, after the ferromagnetic particles contained therein are orientated by means of a magnetic field.

The coating layer thus dried is subjected to a surface-smoothing treatment. For the surface-smoothing treatment, a supercalender or the like may be used. This surface-smoothing treatment is effective in eliminating the voids resulting from solvent removal during drying and in thereby heightening the packing density of ferromagnetic particles in the magnetic layer. As a result, a magnetic recording medium having high electromagnetic characteristics can be obtained.

For the calendering, heat-resistant plastic rolls are used, such as epoxy, polyimide, polyamide, or poly(amide-imide) rolls. It is also possible to use metallic rolls for the calendering.

The magnetic layer of the magnetic recording medium of the present invention preferably has exceedingly high degree of surface smoothness that the center-line average surface roughness ($R_a$) thereof is from 0.1 to 4 nm, preferably from 1 to 3 nm, as measured at a cut-off value of 0.25 mm. This surface roughness can be attained, for example, by forming the coating layers using the specific binder and lower-layer main particles as describe above, and subjecting the formed magnetic layer to the calendering as described above. The calendering is preferably conducted under the conditions of a calender roll temperature of from 60 to 100° C., preferably from 70 to 100° C., more preferably from 80 to 100° C., and a pressure of from 100 to 500 kg/cm, preferably from 200 to 450 kg/cm, more preferably from 300 to 400 kg/cm.

The magnetic recording medium obtained can be used after being cut into a desired size with a slitter or the like.

Since the polyurethane resin used in the present invention has a large proportion of short-chain diol units containing a cyclic structure such as aromatic or alicyclic structures, it gives a coating film which has a higher strength and a higher $T_g$ than those obtained from conventional polyurethane resins, and which is excellent especially in suitability for repetitions of running at high temperatures, etc. In addition, since the polyurethane resin has a high short-chain diol content, the urethane bond concentration in the polyurethane resin is substantially increased, whereby an even higher strength and an even higher $T_g$ are obtained.

Another advantage of the polyurethane resin used in the present invention is that it has excellent solubility in solvents in contrast to conventional polyurethane resins, which are reduced in a solvent solubility and in the dispersibility as the concentration of the cyclic structure and urethane bonds therein increases.

The improved dispersibility of the polyurethane resin for use in the present invention is thought to be attributable to the hydrophilic ether groups contained therein in a determined amount, in which the groups enable the resin to be readily adsorbed onto lower-layer main particles, without lowering the solubility of the resin in solvents.

A still another advantage of the polyurethane resin is that since it is capable of imparting moderate stretchability, the magnetic layer is not brittle and retains satisfactory suitability for repetitions of running.

Furthermore, since the short-chain diol units have the cyclic structure, steric hindrance occurs in the vicinity of urethane bonds to thereby make the urethane bonds less contribute to intermolecular association. Thus, the polyurethane resin has a further advantage that it retains intact solubility even when the concentration of urethane bonds therein is high.

In the case where the polyurethane resin further contains OH groups in terminal branches, these OH groups have higher mobility than the other OH groups. These terminal OH groups are thought to facilitate the adsorption of polyurethane resin molecules onto lower-layer main particles to thereby function to further improve dispersibility. Since this polyurethane resin has improved reactivity with generally employed isocyanate hardeners, it gives a coating layer having a higher degree of durability.

EXAMPLE

The present invention will be explained below in more detail by reference to the following Examples, but the invention should not be construed as being limited thereto.

Example 1-1

A coating composition for magnetic-layer formation and a coating composition for lower-layer formation were prepared according to the following formations.

| (1) Coating Composition for Magnetic-Layer Formation | |
|---|---|
| Fine ferromagnetic metal particles | 100 parts |
| Composition: Fe/Co (atomic ratio) = 100/30 | |
| Al: 7 atomic %, Y: 6 atomic % | |
| $H_c$: 2,450 Oe | |
| $S_{BET}$: 45 m$^2$/g | |
| Crystallite size: 220 Å | |
| Long axis length: 0.18 μm | |
| Acicular ratio: 10 | |
| $\sigma_s$: 155 emu/g | |
| Vinyl chloride copolymer | 10 parts |
| MR-110 (manufactured by Nippon Zeon Co., Ltd.) | |
| Polyurethane resin A (shown in Table 1) | 6 parts |
| α-Al$_2$O$_3$ (average particle diameter: 0.15 μm) | 5 parts |
| Carbon black | 0.5 parts |
| (average particle diameter: 0.08 μm) | |
| Butyl stearate | 1 part |
| Stearic acid | 5 parts |
| Methyl ethyl ketone | 90 parts |
| Cyclohexanone | 30 parts |
| Toluene | 60 parts |
| (2) Coating Composition for Lower-Layer Formation | |
| Nonmagnetic particles, α-Fe$_2$O$_3$ (hematite) | 80 parts |
| Long axis length: 0.15 μm | |
| Acicular ratio: 7 | |
| $S_{BET}$: 52 m$^2$/g | |
| pH: 8 | |
| Tap density: 0.8 | |
| DBP absorption: 27–38 g/100 g | |
| Surface-covering compounds: Al$_2$O$_3$, SiO$_2$ | |
| Carbon black | 20 parts |
| Average primary particle diameter: 16 nm | |
| DBP absorption: 80 ml/100 g | |
| pH: 8.0 | |
| $S_{BET}$: 250 m$^2$/g | |
| Volatile content: 1.5% | |
| Vinyl chloride copolymer | 12 parts |
| MR-110 (manufactured by Nippon Zeon Co., Ltd.) | |
| Polyurethane resin A (shown in Table 1) | 5 parts |
| α-Al$_2$O$_3$ (average particle diameter, 0.2 μm) | 1 part |
| Butyl stearate | 1 part |
| Stearic acid | 1 part |
| Methyl ethyl ketone | 100 parts |
| Cyclohexanone | 50 parts |
| Toluene | 50 parts |

TABLE 1

| Polyurethane Resin A Molecular weight: 36,000 Tg: 94° C. | |
|---|---|
| Structure | mol |
| Hydrogenated bisphenol A | 0.6 |
| Polypropylene oxide adduct of Bisphenol A | 0.3 |
| Sulfoisophthalic acid ethylene oxide adduct | 0.05 |
| Diphenylmethane diisocyanate | 1.0 |
| Trimethylolpropane | 0.05 |
| —SO$_3$Na group (6.0 × 10$^{-5}$ 5 eq/g) | |

For each of the above coating compositions, the ingredients were kneaded with an open kneader and then dispersed with a sand mill. To the resulting dispersion for lower-layer formation was added 5 parts of a polyisocyanate (Coronate L (manufactured by Nippon Polyurethane Co., Ltd.)). To each dispersion was further added 40 parts of a methyl ethyl ketone/cyclohexanone mixed solvent. These dispersions were then filtered through a filter having an average opening diameter of 1 μm to prepare coating compositions respectively for lower-layer formation and magnetic-layer formation.

The two coating compositions obtained were applied by simultaneous multiple layer coating as follows on a 5.2 μm-thick poly(ethylene naphthalate) support having a center-line surface roughness of 0.001 μm on the side where a magnetic layer was to be formed. The coating composition for lower-layer formation was applied first in a dry thickness of 1.5 μm, and then the coating composition for magnetic-layer formation was applied immediately thereafter in such an amount as to give a 0.2 μm-thick magnetic layer. While the two coating layers were still in a wet state, the magnetic particles were orientated with a cobalt magnet having a magnetic force of 5,000 G and a solenoid having a magnetic force of 4,000 G. The coating layers were dried and then treated with the calenders of 7 stages comprising metal rolls and epoxy resin rolls at a temperature of 100° C. and a rate of 200 m/min. Thereafter, a back layer having a thickness of 0.5 μm was formed by coating. The web was slit into an 8-mm width to produce an 8-mm video tape.

Examples 1-2 to 1-5

Video tapes were produced in the same manner as in Example 1-1, except that the nonmagnetic particles incorporated into the lower layer were replaced with each of the following ingredients.

The following nonmagnetic particles were used in Example 1-2.

| Nonmagnetic particles, α-Fe$_2$O$_3$ (hematite) | 80 parts |
|---|---|
| Long axis length | 0.10 μm |
| Acicular ratio | 5 |
| $S_{BET}$ | 60 m$^2$/g |
| pH | 9.0 |
| Tap density | 0.8 |
| DBP absorption | 27–38 g/100 g |
| Surface-covering compounds | Al$_2$O$_3$, SiO$_2$ |

The following nonmagnetic particles were used in Example 1-3.

| Nonmagnetic particles, α-Fe$_2$O$_3$ (hematite) | 80 parts |
|---|---|
| Long axis length | 0.04 μm |
| Acicular ratio | 9 |
| S$_{BET}$ | 70 m$^2$/g |
| pH | 7.5 |
| Tap density | 0.9 |
| DBP absorption | 27–38 g/100 g |
| Surface-covering compounds | Al$_2$O$_3$, SiO$_2$ |

The following nonmagnetic particles were used in Example 1-4.

| Nonmagnetic particles, α-Fe$_2$O$_3$ (hematite) | 80 parts |
|---|---|
| Long axis length | 0.20 μm |
| Acicular ratio | 10 |
| S$_{BET}$ | 50 m$^2$/g |
| pH | 7.0 |
| Tap density | 0.8 |
| DBP absorption | 27–38 g/100 g |
| Surface-covering compounds | Al$_2$O$_3$, SiO$_2$ |

The following nonmagnetic particles were used in Example 1-5.

| Nonmagnetic particles, α-Fe$_2$O$_3$ (hematite) | 80 parts |
|---|---|
| Long axis length | 0.08 μm |
| Acicular ratio | 2 |
| S$_{BET}$ | 55 m$^2$/g |
| pH | 10 |
| Tap density | 0.8 |
| DBP absorption | 27–38 g/100 g |
| Surface-covering compounds | Al$_2$O$_3$, SiO$_2$ |

Comparative Examples 1-1 and 1-2

Video tapes were produced in the same manner as in Example 1-1, except that the nonmagnetic particles incorporated into the lower layer were replaced with each of the following ingredients.

The following nonmagnetic particles were used in Comparative Example 1-1.

| Nonmagnetic particles, α-Fe$_2$O$_3$ (hematite) | 80 parts |
|---|---|
| Long axis length | 0.03 μm |
| Acicular ratio | 7 |
| S$_{BET}$ | 70 m$^2$/g |
| pH | 8.0 |
| Tap density | 0.9 |
| DBP absorption | 27–38 g/100 g |
| Surface-covering compounds | Al$_2$O$_3$, SiO$_2$ |

The following nonmagnetic particles were used in Comparative Example 1-2.

| Nonmagnetic particles, α-Fe$_2$O$_3$ (hematite) | 80 parts |
|---|---|
| Long axis length | 0.25 μm |
| Acicular ratio | 12 |
| S$_{BET}$ | 60 m$^2$/g |
| pH | 7.0 |
| Tap density | 0.9 |
| DBP absorption | 27–38 g/100 g |
| Surface-covering compounds | Al$_2$O$_3$, SiO$_2$ |

Comparative Examples 1-3 to 1-5

Video tapes were produced in the same manner as in Examples 1-3 to 1-5, except that the following polyurethane resin B was used in place of polyurethane resin A incorporated into the lower layer.

Polyurethane Resin B
neopentyl glycol/caprolactonepolyol/diphenylmethane-4,4'-diisocyanate=0.9/2.6/1 (molar ratio) —SO$_3$Na group content: $1 \times 10^{-4}$ eq/g Example 1-6

A video tape was produced in the same manner as in Example 1-1, except that polyurethane resin B described above was used in place of polyurethane resin A incorporated into the magnetic layer.

The video tape samples obtained above were evaluated by the following methods. The results are shown in Table 2.
Methods for Measurements 1. R$_a$: The center-line average surface roughness R$_a$ was determined with a digital optical profilometer (manufactured by WYKO Inc.) by the light interference method under the conditions of a cut-off value of 0.25 mm.

2. Reproduced Output: Using an 8-mm video deck FUJIX8 (manufactured by Fuji Photo Film Co., Ltd.), 7 MHz signals were recorded. The recorded signals were reproduced, and then the noise generating at 6 MHz was measured with a spectral analyzer. The ratio of the level of the reproduced signals to the noise level was determined.

3. Output Decrease: Using an 8-mm video deck FUJIX8 (manufactured by Fuji Photo Film Co., Ltd.), 7 MHz signals were recorded. The recorded signals were reproduced, and then the reproduced output was measured as the initial output with an oscilloscope. The sample was then repeatedly subjected to 120-minute reproduction 100 times. Thereafter, the output was measured to determine the decrease in output from the initial value.

TABLE 2

| | Nonmagnetic particles | | Polyurethane resin | | | | Output decrease (dB) |
|---|---|---|---|---|---|---|---|
| | Long axis length | Acicular ratio | Upper layer | Lower layer | R$_a$ (nm) | C/N (dB) | |
| Example | | | | | | | |
| 1-1 | 0.15 | 7 | A | A | 1.8 | 6.5 | −0.3 |
| 1-2 | 0.10 | 5 | A | A | 2.0 | 5.8 | −0.5 |
| 1-3 | 0.04 | 9 | A | A | 2.5 | 5.5 | −0.8 |
| 1-4 | 0.20 | 10 | A | A | 1.9 | 6.0 | −0.1 |
| 1-5 | 0.08 | 2 | A | A | 2.8 | 4.8 | −0.6 |
| 1-6 | 0.15 | 7 | B | A | 2.6 | 5.0 | −1.0 |
| Comparative Example | | | | | | | |
| 1-1 | 0.03 | 7 | A | A | 3.0 | 4.0 | −1.5 |
| 1-2 | 0.25 | 12 | A | A | 3.5 | 4.2 | −4.0 |

TABLE 2-continued

|  | Nonmagnetic particles | | Polyurethane resin | | | | Output decrease (dB) |
|---|---|---|---|---|---|---|---|
|  | Long axis length | Acicular ratio | Upper layer | Lower layer | $R_a$ (nm) | C/N (dB) |  |
| 1-3 | 0.04 | 9 | A | B | 4.0 | 3.0 | −6.0 |
| 1-4 | 0.20 | 10 | A | B | 3.5 | 3.8 | −2.0 |
| 1-5 | 0.08 | 2 | A | B | 5.0 | 2.5 | −3.0 |

The results summarized in Table 2 show the following. The samples produced in the examples given above each had excellent surface properties, a low noise level, and a high C/N ratio. These samples also had excellent running durability and showed little decrease in output through repetitions of running. In contrast, the samples produced in the comparative examples, which each did not satisfy either of the requirements concerning the lower-layer main particles and binder of the lower layer, were inferior in those properties to the samples produced in the examples.

Example 2-1

In producing the nonmagnetic particles for use in the lower layer in Example 1-1, the raw material was replaced with lepidocrocite, which was dehydrated to obtain the following soft magnetic particles.

Soft magnetic particles:

| Long axis length | 0.15 μm |
|---|---|
| Acicular ratio | 7 |
| $S_{BET}$ | 52 m²/g |
| pH | 8 |
| Tap density | 0.8 |
| DBP absorption | 27–38 g/100 g |
| Surface-covering compounds | $Al_2O_3$, $SiO_2$ |
| Coercive force | 5 Oe |
| $\sigma_s$ | 30 emu/g |

A video tape was produced in the same manner as in Example 1-1, except that the above soft magnetic particles were used.

Example 2-2 to 2-4

The same raw material as in Example 2-1 was dehydrated under different conditions to produce lower-layer particles which were different from those produced in Example 2-1 in coercive force and $\sigma_s$.

Comparative Examples 2-1 to 2-4

Video tapes were produced in the same manner as in Examples 2-1 to 2-4, except that polyurethane resin B used in Comparative Example 1-1 was used in place of polyurethane resin A incorporated into the lower layer.

Example 2-5

A video tape was produced in the same manner as in Example 2-1, except that polyurethane resin B used in Comparative Example 1-1 was used in place of polyurethane resin A incorporated into the magnetic layer.

The samples obtained above were evaluated in the same manner as the above.

TABLE 3

|  | Lower-layer main particles | | Polyurethane resin | | | | Output decrease (dB) |
|---|---|---|---|---|---|---|---|
|  | $H_c$ (Oe) | $\sigma_s$ | Upper layer | Lower layer | $R_a$ (nm) | C/N (dB) |  |
| Example |  |  |  |  |  |  |  |
| 1-1 | 0 | 0 | A | A | 1.8 | 5.5 | −0.3 |
| 2-1 | 5 | 30 | A | A | 1.9 | 5.4 | −0.2 |
| 2-2 | 100 | 10 | A | A | 2.0 | 5.2 | −0.1 |
| 2-3 | 200 | 5 | A | A | 2.3 | 5.3 | −0.4 |
| 2-4 | 300 | 60 | A | A | 2.5 | 5.0 | −0.2 |
| 2-5 | 5 | 30 | B | A | 2.2 | 5.0 | −0.5 |
| Comparative Example |  |  |  |  |  |  |  |
| 2-1 | 5 | 30 | A | B | 4.5 | 3.0 | −2.0 |
| 2-2 | 100 | 10 | A | B | 3.5 | 4.0 | −4.0 |
| 2-3 | 200 | 5 | A | B | 4.0 | 4.2 | −3.0 |
| 2-4 | 300 | 60 | A | B | 5.0 | 2.8 | −6.0 |

The video tape samples produced in the examples given above each had excellent surface properties, a low noise level, and a high C/N ratio. These samples also had excellent running durability and showed little decrease in output through repetitions of running.

Example 3-1

In producing the nonmagnetic particles for use in the lower layer in Example 1-1, the amounts of the surface-covering compounds, $Al_2O_3$ and $SiO_2$, were changed to obtain the following nonmagnetic particles.

Nonmagnetic particles, $\alpha$-$Fe_2O_3$ (hematite):

| Long axis length | 0.15 μm |
|---|---|
| Acicular ratio | 7 |
| $S_{BET}$ | 52 m²/g |
| pH | 8 |
| Tap density | 0.8 |
| DBP absorption | 27–38 g/100 g |
| Amount of $Al_2O_3$:Al/Fe | 5 atomic % |
| Amount of $SiO_2$:Si/Fe | 1.5 atomic %. |

A video tape sample was produced in the same manner as in Example 1-1, except that the above nonmagnetic particles were used.

Examples 3-2 to 3-4

Video tapes were produced in the same manner as in Example 3-1, except that nonmagnetic powders having different surface treatment amounts were produced and used for the lower layer.

Comparative Examples 3-1 and 3-2

Video tapes were produced in the same manner as in Examples 3-3 and 3-4, except that polyurethane resin B used in Comparative Example 1-1 was used in place of polyurethane resin A incorporated into the lower layer.

Example 3-5

A video tape was produced in the same manner as in Example 2-1, except that polyurethane resin B described above was used in place of polyurethane resin A incorporated into the magnetic layer in Example 3-1.

The video tape samples obtained above were evaluated in the same manner as the above.

TABLE 4

| | Nonmagnetic particles | | Polyurethane resin | | $R_a$ | C/N |
|---|---|---|---|---|---|---|
| | Al/Fe* | Si/Fe* | Upper layer | Lower layer | (nm) | (dB) |
| Example | | | | | | |
| 1-1 | 0.5 | 1 | A | A | 1.8 | 5.5 |
| 3-1 | 5 | 1.5 | A | A | 1.9 | 5.4 |
| 3-2 | 10 | 0.5 | A | A | 2.0 | 5.2 |
| 3-3 | 8 | 5 | A | A | 2.3 | 5.3 |
| 3-4 | 3 | 3 | A | A | 2.5 | 5.0 |
| 3-5 | 5 | 1.5 | B | A | 2.5 | 4.5 |
| Comparative Example | | | | | | |
| 3-1 | 8 | 5 | A | B | 4.0 | 3.0 |
| 3-2 | 3 | 3 | A | B | 5.0 | 1.0 |

*: atomic %

The samples produced in the examples given above each had excellent surface properties, a low noise level, and a high C/N ratio. In contrast, the samples produced in the comparative examples, which employed as a binder for the lower layer a polyurethane resin not satisfying the requirement characteristic of the present invention, were inferior in those properties to the samples produced in the examples, although the amounts of Al and Si as surface-covering compounds therein were within the respective preferred ranges.

According to the present invention, a magnetic recording medium which has a magnetic layer having improved surface properties and combines improved electromagnetic characteristics and improved durability can be provided by forming a lower coating layer using a polyurethane resin of a specific structure having the cyclic structure and containing the ether group and using nonmagnetic particles or soft magnetic particles having specific shape/size properties.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon at least two coating layers which comprise:
   a lower coating layer mainly comprising (1) at least one particles selected from nonmagnetic particles or soft magnetic particles and (2) a binder, formed on the support, and
   a magnetic layer comprising ferromagnetic particles dispersed in a binder, formed on the lower coating layer, wherein at least said lower coating layer contains a polyurethane resin having a cyclic structure and containing an ether group, and said nonmagnetic particles or soft magnetic particles contained in said lower coating layer have an average long axis length of from 0.04 to 0.20 μm and an acicular ratio (long axis/short axis) of from 2 to 10.

2. The magnetic recording medium as claimed in claim 1, wherein said polyurethane resin contained as a binder is a polyurethane resin which is a reaction product obtained mainly from a diol and an organic diisocyanate and which contains short-chain diol units having a cyclic structure and having a molecular weight equal to or more than 50 but less than 500 in an amount of from 17 to 40% by weight based on the polyurethane resin, and long-chain diol units containing an ether group having a weight average molecular weight of from 500 to 5,000 in an amount of from 1.0 to 5.0 mmol per g of the whole polyurethane resin, in an amount of from 10 to 50% by weight based on the polyurethane resin.

3. The magnetic recording medium as claimed in claim 1, wherein said nonmagnetic particles or soft magnetic particles have a coercive force ($H_c$) of from 0 to 300 (Oe) and a saturation magnetization ($\sigma_s$) of from 0 to 80 emu/g.

4. The magnetic recording medium as claimed in claim 1, wherein the nonmagnetic particles or soft magnetic particles contain aluminum in an amount of from 0.5 to 10 atomic % based on the iron and silicon in an amount of from 0.5 to 5 atomic % based on the iron.

5. The magnetic recording medium as claimed in claim 1, wherein the magnetic layer has a thickness of from 0.05 to 1.0 μm.

6. The magnetic recording medium as claimed in claim 1, wherein said polyurethane resin has a weight-average molecular weight (Mw) of from 5,000 to 100,000 and a glass transition temperature (Tg) of from 0 to 200° C.

7. The magnetic recording medium as claimed in claim 1, wherein said polyurethane resin contained in the lower layer is contained in an amount of at least 10% by weight based on the total amount of the binder.

8. The magnetic recording medium as claimed in claim 2, wherein said short-chain diol is at least one diol selected from the group consisting of a hydrogenated bisphenol A represented by formula (I) and ethylene oxide or propylene oxide adducts thereof.

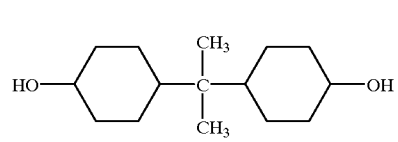
(I)

9. The magnetic recording medium as claimed in claim 2, wherein said long-chain diol is a compound represented by formula (II):

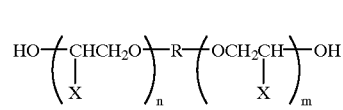
(II)

R is at least one of the following

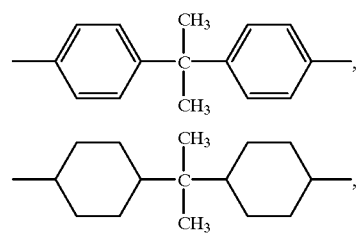

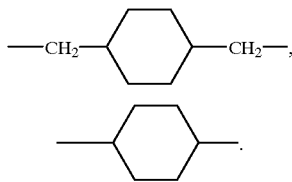

wherein n an m each represents a number of from 3 to 24, and X represents a hydrogen atom or a methyl group.

10. The magnetic recording medium as claimed in claim 2, wherein said polyurethane resin has from 3 to 20 OH groups per one molecule.

11. The magnetic recording medium as claimed in claim 2, wherein said polyurethane resin contains at least one polar group selected from the group consisting of —$SO_3M$, —$OSO_3M$, —COOM, —$PO_3MM'$, —$OPO_3MM'$, —NRR', and —$N^+RR'R''COO^-$ (wherein M and M' each independently represents hydrogen, an alkali metal, an alkaline earth metal, or an ammonium salt, and R, R', and R" each independently represents an alkyl group having 1 to 12 carbon atoms), in an amount of from $1 \times 10^{-5}$ to $2 \times 10^{-4}$ eq/g.

12. The magnetic recording medium as claimed in claim 2, wherein said organic diisocyanate is aromatic diisocyanates selected from the group consisting of 2,4-tolylene diisocyanate, 2,6-tolylene diisocyanate, xylene 1,4-diisocyanate, xylene 1,3-diisocyanate, 4,4'-diphenylmethane diisocyanate, 4,4-diphenyl ether diisocyanate, 2-nitrodiphenyl 4,4'-diisocyanate, 2,2'-diphenylpropane 4,4'-diisocyanate, 4,4'-diphenylpropane diisocyanate, m-phenylene diisocyanate, p-phenylene diisocyanate, naphthylene 1,4-diisocyanate, naphthylene 1,5-diisocyanate, and 3,3'-dimethoxydiphenyl 4,4'-diisocyanate; aliphatic diisocyanates selected from the group consisting of lysine diisocyanate, and/or alicyclic diisocyanates selected from the group consisting of isophorone diisocyanate, hydrogenated tolylene diisocyanate, and hydrogenated diphenylmethane diisocyanate.

13. The magnetic recording medium as claimed in claim 1, wherein said nonmagnetic particles or soft magnetic particles have an average long axis length of from 0.1 to 0.16 $\mu$m and an acicular ratio of from 5 to 9.

14. The magnetic recording medium as claimed in claim 1, wherein said lower coating layer further contains carbon black.

15. The magnetic recording medium as claimed in claim 1, wherein said magnetic layer further contains abrasive materials, carbon black and lubricants.

16. The magnetic recording medium as claimed in claim 1, wherein when said binder is used for forming at least a lower coating layer, said polyurethane resin is used in combination with a synthetic resin based on vinyl chloride.

17. The magnetic recording medium as claimed in claim 1, wherein said nonmagnetic support has a back coat layer on the side opposite to the side where a magnetic coating composition is provided.

18. The magnetic recording medium as claimed in claim 1, wherein said magnetic layer has a center-line average surface roughness of from 1 to 3 nm.

* * * * *